UNITED STATES PATENT OFFICE.

SANTIAGO LIMA, OF NEW YORK, N. Y., ASSIGNOR OF ONE-HALF TO GEORGE W. HOJER, OF SAME PLACE.

LIQUID STARCH-POLISH COMPOUND.

SPECIFICATION forming part of Letters Patent No. 234,680, dated November 23, 1880.

Application filed September 3, 1880. (No specimens.)

*To all whom it may concern:*

Be it known that I, SANTIAGO LIMA, a citizen of the United States, and residing in the city, county, and State of New York, have invented a new and useful Improvement in Liquid Starch-Polish Compounds; and I declare that the following is a full, clear, and accurate description of the method or mode of compounding and making the same.

To twenty-five quarts of water I add sixty ounces of borax. To this I add five ounces of pure refined tallow or white wax, one and one-half ounce of cotton-seed oil or olive-oil, or some similar vegetable oil, one-half ounce of gelatine, and one-half ounce of castor-oil. This mixture is put in a boiler and boiled until it is thoroughly dissolved, and after being thoroughly mixed and dissolved is taken away from the fire or heat and allowed to cool. After it is cold the liquid is passed through a cloth or fine sieve to strain it. Care must be taken to conduct the whole process with cleanliness.

A greater or less quantity than the above may be made at one time, if desired; but the same relative proportions must be preserved between the materials or ingredients.

To each two and one-half ounces of the liquid so formed I add one pound of ordinary starch, which forms my starch compound.

If desired, the liquid above formed may be sold to consumers, and they, by adding the same in the above proportion to ordinary starch, can obtain the starch-compound.

The advantages of my liquid starch-polish compound are that it is more economical than ordinary starch, requires no boiling or cooling, and is always ready. The clothes or articles to be ironed do not require to be dried before ironing, but may be wrung out and ironed wet.

The gloss on the articles starched I consider to be superior to that produced by any of the means now used for producing gloss.

My compound also contains no acid destructive to the clothes or articles to be starched.

I am aware that a solid starch-polish compound formed in cakes, and consisting of white wax, spermaceti, castor-oil, mutton-tallow, borax, salt, gum-arabic, and isinglass, has heretofore been employed, a small piece of said polish being put with starch in cold water and boiled fifteen or twenty minutes and strained; and I therefore lay no claim to such starch-polism compound, which differs from mine, first, in being composed of different ingredients, my compound having no salt, gum-arabic, or isinglass, and the starch-polish disclaimed containing no gelatine. The compound further differs in that my compound is a liquid and the compound disclaimed a solid, and that starch is merely dissolved for use in my liquid compound without boiling or other process, while the solid compound of the invention disclaimed must be boiled with the starch and strained before it can be applied to the clothes.

Having thus described my invention, what I claim, and desire to secure by Letters Patent, is—

The liquid starch-polish compound herein described, consisting of water, borax, refined tallow, cotton-seed oil, gelatine, and castor-oil, in about the proportions set forth, and adapted as a solvent and polish for starch without boiling or other process, substantially as described.

SANTIAGO LIMA.

In presence of—
CHARLES G. COE,
ALBERT H. FROST.